United States Patent [19]

Perry et al.

[11] 4,195,334
[45] Mar. 25, 1980

[54] HIGH-VOLTAGE DC TRANSMISSION SYSTEM AND METHOD

[75] Inventors: Elijah R. Perry, Portola Valley; Mario Rabinowitz, Menlo Park, both of Calif.

[73] Assignee: Electric Power Research Institute, Inc., Palo Alto, Calif.

[21] Appl. No.: 854,977

[22] Filed: Nov. 25, 1977

[51] Int. Cl.² .............................................. H02M 1/12
[52] U.S. Cl. ..................................... 363/44; 363/129; 363/125
[58] Field of Search .................. 307/151, 306; 310/52; 322/79, 100; 323/44 F; 363/14, 44, 45, 47, 51, 125, 126, 129, 128

[56] References Cited

U.S. PATENT DOCUMENTS

| 3,510,753 | 5/1970 | Lawn | 363/47 X |
| 3,746,963 | 7/1973 | VeNard | 363/47 |

OTHER PUBLICATIONS

EPRI Report RP429-1, "New Armature Winding Concepts for EHV and High CFCT Applications of Superconducting Turbine Generators", C. Flick; Westinghouse Corp.
Cryogenics, "Cryogenic Power Generation", M. Rabinowitz, pp. 319-329, Jun. 1977.

Primary Examiner—William M. Shoop
Attorney, Agent, or Firm—Flehr, Hohbach, Test, Albritton & Herbert

[57] ABSTRACT

A high-voltage DC transmission system and method is characterized by a minimum filtering requirement as to ripple as well as to surge and harmonics. Use of a superconducting generator directly coupled to rectifying means eliminates the requirement of a step-up transformer and allows operation at high frequency for minimizing ripple (and related filtering).

18 Claims, 2 Drawing Figures

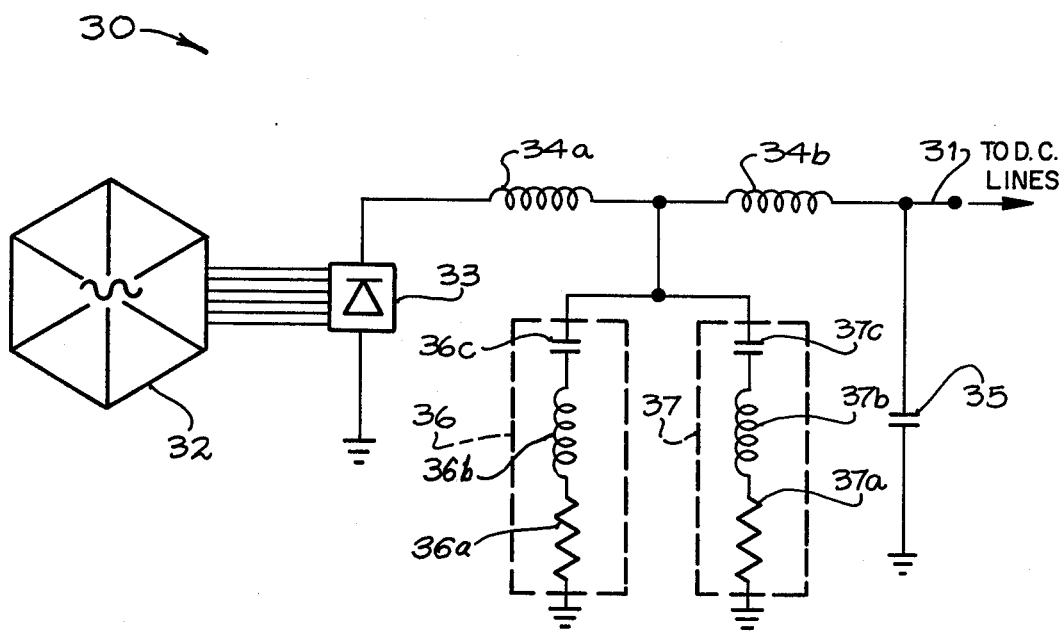
FIG_1

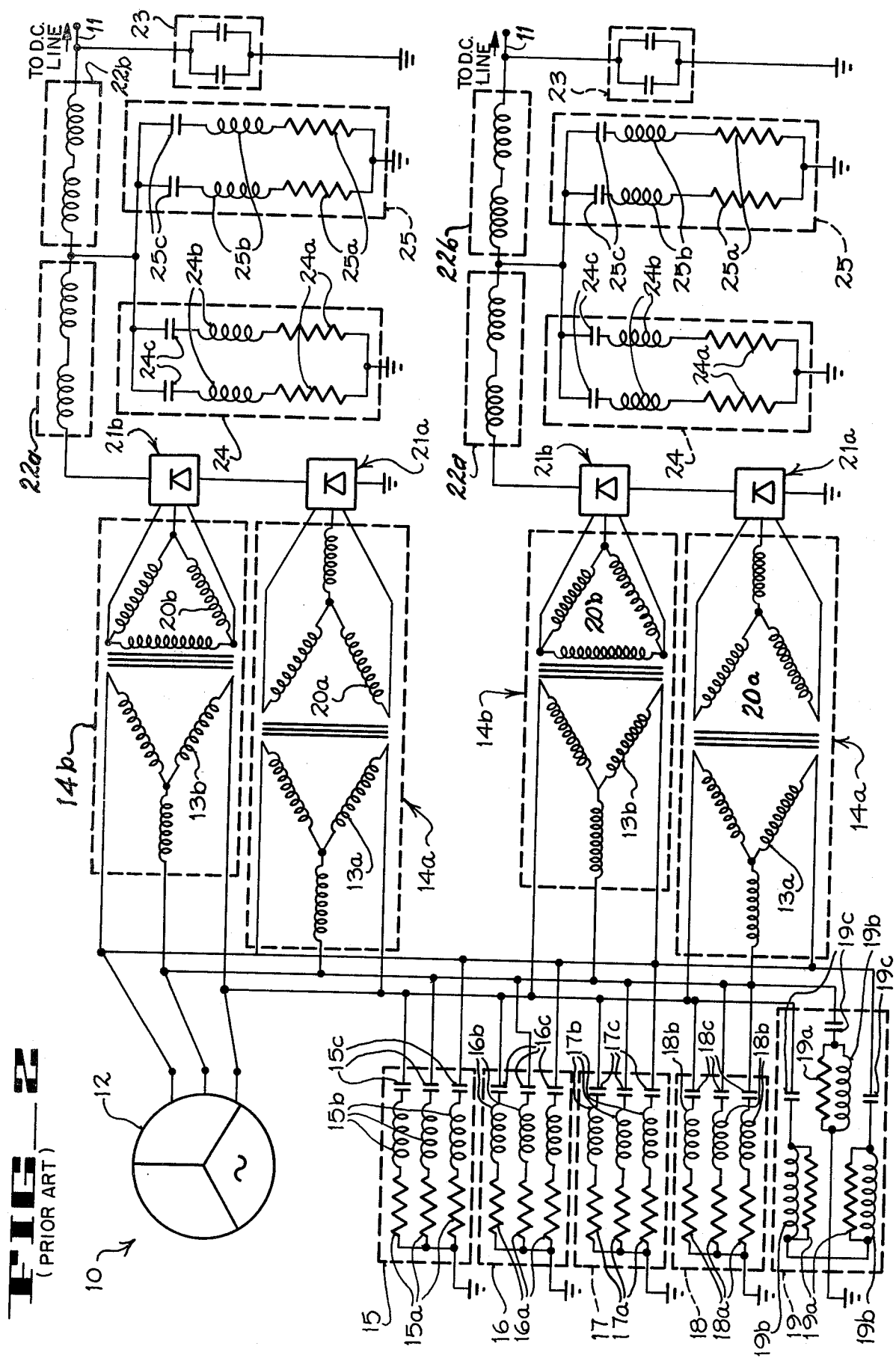

HIGH-VOLTAGE DC TRANSMISSION SYSTEM AND METHOD

BACKGROUND OF THE INVENTION

This invention pertains to transmission systems and more particularly to high-voltage transmission systems particularly useful for transmitting electricity over great distances at low cost.

DC transmission is known to be significantly less costly than AC, but heretofore has been limited by the high cost of conversion involving the necessary transformers and filtering devices. In view of the present development of energy sources such as nuclear, solar, coal mine mouth generation, etc. usually located at great distances from high density urban areas where the electrical energy will be consumed, DC transmission now appears highly desirable as the means to convey the power produced by these sources.

In well known high-voltage DC generation systems a 60 Hz or other low frequency, low-voltage generator is coupled to a high-voltage step-up transformer. The output of the transformer is rectified and transmitted via a number of filters. The term "high voltage" as used herein pertains substantially to at least 138 kV.

In high-voltage DC transmission systems of the kind described substantial filtering is typically required, at significant expense, to remove the ripple superimposed at the DC output. Substantial filtering on the primary side of the transformer is also required to prevent surge and harmonics from getting back to the generator.

As is known, an increase in frequency reduces the degree of ripple and of filtering required. Hence, it is desired to generate at high-voltage and at high frequency at least of the order of 120 Hz in order to reduce the filtering requirements and attendant expense. Since, as noted above, the usual high-voltage DC system employs a low frequency, low-voltage generator coupled to a high-voltage transformer, the frequency of the output of the transformer remains at low frequency with attendant burdensome ripple requiring filtering.

The mere substitution of a low-voltage high-frequency generator in the above type of well known system is deemed unsatisfactory since increasing the frequency of the geneator increases the transformer impedance and losses (especially core losses), and decreases the power transmitted. The transformer reactance (caused by leakage flux) and hence the reactance voltage drop varies in direct relation to the frequency.

Accordingly, doubling the frequency provides a distinct disadvantage in the provision of prior DC power stations as above. Furthermore, it is impractical to try to generate at substantially higher voltages and frequencies with a conventional generator in view of the fact that the flux density is limited by iron saturation, and the armature turns must be insulated from the grounded iron thereby limiting the turns density and the voltage.

As is known, the amplitude of the ripple is decreased approximately inversely as the square of the number of phases. Similarly, the filters are reduced as the frequency is increased. In a conventional system utilizing a high voltage transformer, as the number of phases are increased, the cost of the transformer(s) increases in direct proportion, which cost is substantial. Whereas by employing a superconducting high-voltage generator system herein disclosed, the transformer(s) is entirely eliminated. This permits an increase in the number of phases without incurring this cost penalty.

It has been observed that in a conventional generator, iron is essential in order to lower the reluctance of the magnetic circuit, but limits the flux density and the output voltage. On the other hand a superconducting generator eliminates most of the iron so as to introduce into the generator degrees of freedom not previously obtainable. Accordinly, it is possible (with a superconducting generator) to generate at full-line voltage (up to 500 kV and higher). This is possible in view of the fact that when grounded iron is removed, only the inter-turn voltage needs to be insulated between adjacent bars throughout most of the armature. This further eliminates the need for a high-voltage transformer and by increasing the frequency and number of phases reduces the filtering requirements substantially.

Elimination of the transformer accomplishes a reduction in the capital and operating expenses involved in same while the higher voltage in the superconducting generator is achieved at almost no increase in cost. In addition by eliminating the transformer and employing a generator which can generate at high frequency and voltage a given (capacitance/inductance) filter becomes more effective in filtering out the ripple superimposed on the DC. Therefore less reactance is needed in the filters both on the input and output sides of the diodes (rectifying means).

Thus, by removing the transformer the higher frequency becomes a decided advantage. Reactors, including inductance and capacitance, can be eliminated substantially in the ratio of the new frequency to 60 Hz. In addition the reactors present on the primary side of the transformer to protect the generator from surge and harmonics can also be eliminated.

Aside from a safe factor of about 20% overspeed, the frequency of a generator cannot usually be expected to be increased by simply running it at a higher speed since turbo-generator sets are generally designed for optimum performance. This requires them to operate near the centripetal force stress limit of the rotor materials. However, in a superconducting generator, the number of rotor poles may easily be increased to increase the frequnecy. (Similarly, the number of phases may be easily increased.) Thus, in an AC generator of a given rating operating at 3600 rpm and 60 Hz, if the rotor is changed from 2 to 4 poles the output frequency will increase to 120 Hz while it continues to run at the same speed. Similarly, if the rotor is increased to a 6 pole rotor the frequency will increase to 180 Hz.

Reactor devices characterized by inductance and capacitance are employed for effecting the requisite filtering on the output as needed. The need becomes much less as the frequency or the number of phases increases, as noted above. An increase in frequency by a factor of three can reduce the reactor requirement by substantially a factor of three. An increase in the number of phases by a factor of two reduces the reactor requirement by approximately a factor of four.

A detailed description of high-voltage superconducting generators is given in EPRI Report RP429-1, November, 1977, Superconducting Generator Design, for which Mario Rabinowitz was the EPRI Project Manager. Additionally, the following two-pre-prints prepared to be presented at the IEEE Winter Power Meeting, January, 1978, and now available also describe the design and operation of a high-voltage superconducting generator: 1. New Armature Winding Concepts for EHV (Extra High Voltage) and High CFCT (Critical Fault Clearing Times) Applications of Superconducting Turbine Generators, by C. Flick. 2. Design of Large Superconducting Turbine Generators for Electric Utility Application, by J. H. Parker, Jr. and R. A. Towne. A third published paper also discusses this, entitled Cryogenic Power Generation, by Mario Rabinowitz, *Cryogenics*, Vol. 17, p. 319–330, June, 1977.

SUMMARY OF THE INVENTION AND OBJECTS

In accordance with the present invention, a high-voltage DC transmission system includes a high-voltage, high frequency, multiple-phase generator in which the voltage generated is at least substantially as high as 138 kV, generated at a frequency at least as high as 120 Hz, with more than three phases. Rectifying means directly receive the output from the generator. Filtering means are coupled to receive the output of the rectifying means so as to remove ripple from the DC signal therefrom. The filtering means is characterized by that degree of reactance dictated by the high frequency and number of phases at the input to the rectifier so as to be no more than sufficient to substantially minimize ripple superimposed onto the DC output. Little or no filtering means is needed to protect the generator, in contrast with a conventional system.

In general it is an object of the present invention to provide an improved DC transmission system and method at significantly less cost by minimizing the filtering required and by eliminating the need for (and cost of) a transformer.

It is another object of the present invention to provide a high-voltage, high frequency, multiple-phase AC current to be directly converted to DC current so as to minimize the filtering required for ripple on the DC side as well as to eliminate the provision of a transformer, and filters to protect the generator.

The foregoing and other objects of the invention will become more readily evident from the following detailed description of a preferred embodiment when considered in conjunction with the drawings.

BRIEF DESCRIPTION OF THE DRAWINGS

FIG. 1 is a schematic diagram of a circuit for generating a high-voltage DC current showing one pole of the DC line in one embodiment of the invention;

FIG. 2 shows a schematic diagram of an electrical arrangement using a known 60 Hz, low voltage, three-phase generator for producing a high-voltage DC current according to the prior art.

DETAILED DESCRIPTION OF A PREFERRED EMBODIMENT

As shown in FIG. 2 a DC transmission line 11 of the prior art is provided with a high-voltage DC current by means of the circuit 10. Thus, the prior art circuit 10 is arranged as now to be described.

Accordingly, a low frequency, low-voltage generator 12 is coupled to the primary windings 13a and 13b of transformers 14a and 14b. Transformer 14a is connected wye-wye and transformer 14b is connected wye-delta to produce a 30° phase shift to help reduce harmonic level.

Means for protecting generator 12 from surge and harmonics in the line coupled thereto comprises the filters 15, 16, 17, 18 and 19 composed respectively of resistors 15a, 16a, 17a, 18a and 19a; inductors 15b, 16b, 17b, 18b and 19b; and capacitors 15c, 16c, 17c, 18c and 19c.

Filters 15, 16, 17, 18 and 19 are connected to a common ground as shown. Typically the 6n ±1 (n = 1, 2) harmonics are filtered here. Hence the filters 15, 16, 17 and 18 filter the 5th, 7th, 11th and 13th harmonics respectively. Filter 19 is a high pass damped filter.

The secondary sides 20a and 20b of transformers 14a and 14b develop a high-voltage AC current at the same frequency as generator 12. This high-voltage of secondaries 20a and 20b is rectified via the diode means 21a and 21b and then fed through smoothing inductors 22a and 22b, and capacitors 23. The term "diode means" as used herein refers to the known rectification system, generally a full wave bridge, as commonly used in such power systems.

Filters 24 and 25 composed of resistors 24a, 25a, inductors 24b, 25b and capacitors 24c, 25c provide filtering means coupled to receive the output of the rectifying means 21 to typically filter the 6th and 12th harmonics respectively.

As is clearly evident, in an arrangement of the kind described the expense of the filtering elements 15, 16, 17, 18, 19, 22, 23, 24 and 25 is a significant aspect of the system. The need for these filters can be substantially reduced by increasing the frequency or the number of phases on the AC side of the system.

However, as noted above, any significant increase in the frequency of generator 12 above 60 Hz serves to develop a significant impedance and increase in losses in transformers 14 which reduces the current and hence the power in line 11. Also as noted above, any substantial increase in the number of phases significantly increases the cost of the system because of the transformers.

Accordingly, as shown in FIG. 1 a novel high-voltage DC power transmission system 30 provides a high-voltage DC current on a transmission line 31 with the elimination of the transformers and substantially less need for filtering. Thus, a high-voltage, high frequency, multiple phase superconducting generator 32 characterized by the elimination of armature iron is directly coupled to diode means 33 which directly receives the output of generator 32.

Smoothing inductors 34a, 34b, and capacitor 35 (considerably reduced in rating compared with a conventional system) help smooth out the rectified current from diode means 33. As shown, substantially all filters which are present in a conventional system to protect the generator can be eliminated so that the generator requires substantially no filter protection under the usual conditions.

Filtering means 36 and 37 characterized by that degree of reactance as dictated by the high frequency to be sufficient to substantially minimize ripple superimposed onto the DC output are comprised of resistors 36a, 37a, inductors 36b, 37b and capacitors 36c, 37c. Since the ripple is greatly decreased by the increased frequency and number of phases, the ratings of these filter elements are correspondingly decreased. p It is to be noted that rectifier 33 directly receives the output of the high-voltage, high frequency, multiple phase superconducting generator. Not only is the cost of the expensive transformers eliminated by eliminating the transformers, but the expense associated with filter and smoothing reactors is also substantially reduced.

In operation, the system 30 carries out a method of providing a substantially ripple free high-voltage DC for transmission over great distances following the steps of generating a high frequency, multiple-phase, high-voltage AC current in which the high frequency is at lest 120 Hz the number of phases is greater than three, and the high-voltage is at least 138 kV. Next the AC output is rectified directly after being generated to provide a high-voltage DC output. The next step is to filter ripple from the DC output to only that degree dictated by the frequency and number of phases of the AC output.

Accordingly, there has been provided an improved high-voltage DC transmission system at lower cost and greater efficiency by introducing the superconducting generator 32. Superconducting generators of the type as shown in FIG. 1 are known and characterized by minimal iron therein so as to permit increased voltage, increased number of phases, and increased frequency.

From the foregoing it will be readily evident that there has been provided a simplified, more reliable, less expensive both as to capital and operating costs, and generally improved high-voltage DC transmission system. It has been observed that there is an average of five catastrophic failures per year of high-voltage step-up transformers which are entirely eliminated by means of this novel system. These failures have generally resulted in tank rupture with ejection of the transformer oil. In 70% of these catastrophes, the oil cataches fire and totally destroys the transformer. In 60% of these failures, the fires were so intense that they destroyed adjacent equipment resulting in severe damage to the turbine building.

Another advantage is the elimination of the transformer capital costs and operating expenses which are substantial. (The higher voltage in the superconducting generator is achieved at substantially no increase in cost.) As a tangible example, an estimate of costs and cost savings in a 3000 MVA mine mouth power plant can be estimated. Transformer capital costs vary from $2 to $4/kVA. Using $3/kVA as a representative value:

First eliminate transformer capital cost of ($3/kVA) (3000 MVA)=$9,000,000.
Assuming that such a transformer is 99.7% efficient implies the losses are 9 MW. At 20 mils/kW-hr, and at 80% availability this reduces transformer operating cost by ($.02/kWhr) (9MW) (0.8) (8766 hr/yr)=$1,262,000/yr.

There are further savings related to financing, real estate, etc. This does not include savings related to the superconducting generator which is less costly and more efficient than a conventional one.

To make a conservative cost savings estimate on the filters based only on increasing the frequency to 120 Hz, it is possible to eliminate roughly half the reactors:

reactor capital cost = 1/2 ($3/kVA) (3000MVA)
= $4,500,000

At 99.5% reactor system efficiency and 80% availability, this eliminates half of the reactor operating cost = 1/2 ($.02/kWhr) (15MW) (0.8) (8766 hr/yr)
= $1,052,000/year Thus, a considerable saving in both capital and operating costs is made by the above system.

| | SAVINGS | |
|---|---|---|
| | Capital | Operating |
| Transformer | $9,000,000 | $1,262,000/year |
| Reactors | 4,500,000 | 1,052,000/year |
| TOTAL | $13,500,000 | $2,314,000/year |

Additionally, the superconducting generator can be designed for lower reactance than a conventional generator. This, together with elimination of the transformer reactance, means that the overall reactance can be considerably reduced. Neglecting fault currents, this results in enhanced diode performance.

We claim:

1. In a system for transmitting high-voltage DC comprising a high-voltage, high frequency superconducting generator having at least four phases and generating a voltage of at least substantially 138 kV at a frequency of at least substantially 120 Hz, rectifying means coupled directly to said generator to receive the output therefrom free of step-up transformer action applied to the output of said generating means so as to provide a high voltage DC output, and filtering means coupled to receive said DC output of said rectifying means, said filtering means being characterized by a substantial reduction of reactance for filtering the DC output.

2. In a system for transmitting high-voltage DC according to claim 1 in which the input side of said rectifying means is substantially free of filtering.

3. In a system for tranbsmitting high-voltage DC according to claim 1 in which said generator requires substantially no protection by filters from the influence of harmonics or surge.

4. In a system for transmitting high-voltage DC according to claim 1 in which said superconducting generator is characterized by minimal iron therein and disposed to be substantially unprotected from harmonics or surge by the presence of filters.

5. The method of providing a substantially ripple free high-voltage DC transmission comprising the steps of superconductively generating a high frequency, high-voltage, multiple phase AC current in which the number of phases is at least four and in which said high frequency is at least 120 Hz and said high-voltage is at least 138 kV, and rectifying said AC current directly after generating same free of transforming the output voltage of said generator to provide a high-voltage DC output, and filtering ripple from DC output to a degree defined by said frequency and number of phases.

6. The method of providing a substantially ripple free high-voltage DC for transmission comprising the steps of superconductively generating a high-voltage, high frequency, multiple-phase AC current while requiring substantially no filter protection of the generator from surge or harmonics, rectifying said AC current next after said geneation to provide a high-voltage DC, and filtering ripple from said DC to a degree defined by said frequency and number of phases.

7. In a system for transmitting a high-voltage DC comprising a high-voltage superconducting generator having at least four phases and generating a voltage of at least substantially 138 kV, rectifying means coupled direct to said generator in a manner free of transforming the output voltage of said generator to receive the output therefrom and provide a DC output, and filtering means coupled to receive said DC output of said rectifying means.

8. In a system for transmitting high-voltage DC according to claim 7 in which the input side of said rectifying means is substantially free of filtering.

9. In a system for transmitting high-voltage DC according to claim 7 in which said generator requires substantially no protection by filters from the influence of harmonics or surge.

10. In a system for transmitting high-voltage DC according to claim 7 in which said superconducting generator is characterized by minimal iron therein and disposed to be substantially unprotected from harmonics or surge by the presence of filters.

11. The method of providing a substantially ripple free high-voltage DC transmission comprising the steps of superconductively generating a high-voltage, multiple phase AC current in which the number of phases is at least four and in which said high-voltage is at least 138 kV, and rectifying said AC current next after generating same to provide a high-voltage DC output, and filtering ripple from said DC output to a degree defined by said number of phases.

12. The method of providing a substantially ripple free high-voltage DC for transmission comprising the steps of superconductively geneating a high-voltage, multiple-phase AC current while requiring substantially no filter protection of the generator fromm surge or harmonics, rectifying said AC current next after said generation to provide a high-voltage DC, and filtering ripple from said DC to a degree defined by said phases.

13. In a system for transmitting high-voltage DC comprising a high-voltage, high frequency superconductively generator providing a voltage of at least substantially 138 kV at a frequency of at least substantially 120 Hz, rectifying means coupled electrically next to said generator to receive the output therefrom and provide a DC output, and filtering means coupled to receive said DC output of said rectifying means, said filtering means being characterized by that degree of reactance dictated by said high frequency to be sufficient to substantially minimize ripple superimposed into the DC output.

14. In a system for transmitting high-voltage DC according to claim 13 in which the input side of said rectifying means is substantially free of filtering.

15. In a system for transmittig high-voltage DC according to claim 13 in which said generator requires substantially no protection by filters from the influence of harmonics or surge.

16. In a system for transmitting high-voltage DC according to claim 13 in which said superconducting generator is characterized by minimal iron therein and disposed to be substantially unproptected from harmonics or surge by the presence of filters.

17. The method of providing a substantially ripple free high-voltage DC transmission comprising the steps of superconductively generating a high frequency, high-voltage AC current, and in which said high frequency is at least 120 Hz and said high-voltage is at least 138 kV, and rectifying said AC current next after generating same to provide a high-voltage DC output, and filtering ripple from said DC output to a degree defined by said frequency.

18. The method of providing a substantially ripple free high-voltage DC for transmission comprising the steps of superconductively generating a high-voltage, high frequency AC current while remaining unprotected from surge or harmonics, retifying said AC current next after said generation to provide a high-voltage DC, and filtering ripple from said DC to a degree defined by said frequency.

* * * * *